Figure 1:
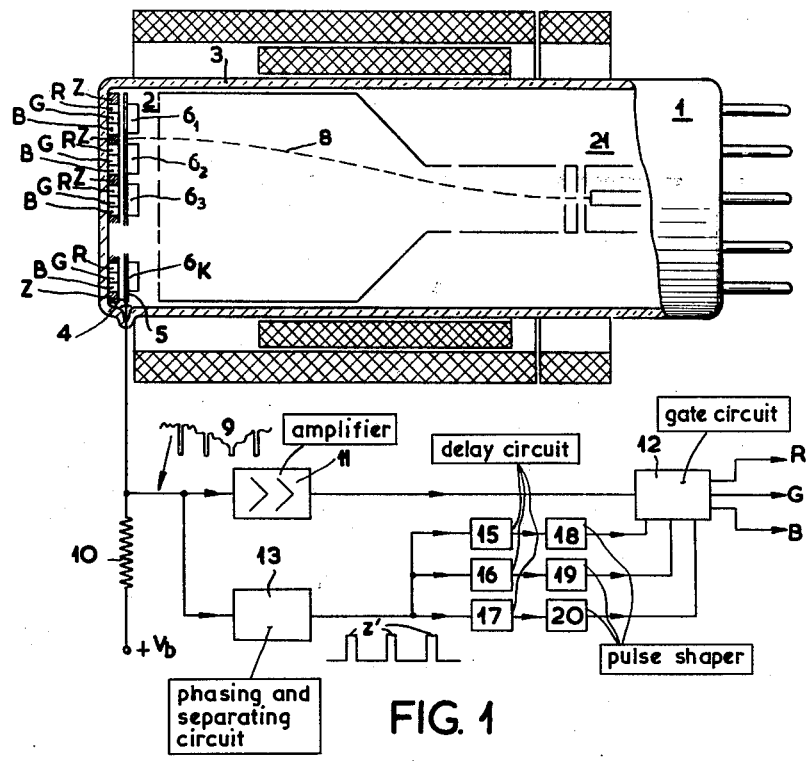

INVENTOR
JOHAN WIM BRAICKS

3,001,012
COLOR TELEVISION CAMERA TUBE WITH INDEXING STRUCTURE
Johan Wim Braicks, Eindhoven, Netherlands, assignor to North American Philips Company, Inc., New York, N.Y., a corporation of Delaware
Filed Mar. 23, 1959, Ser. No. 801,067
Claims priority, application Netherlands Apr. 28, 1958
6 Claims. (Cl. 178—5.4)

The present invention relates to camera tubes for televising coloured images, a single tube and a co-acting colour filter permitting light having $m$ colour components to be converted into a single electric signal containing information about the $m$ colour components and the instant of their occurrence.

Such camera tubes are used, for example, in tricolour television systems, $m$ then being 3. As is known in televising images, it is advantageous to use only one camera tube instead of using three such tubes, a single scanning mechanism then replacing three such scanning mechanisms which require perfect synchronism. Adjustment is much simpler, since matching the brightness levels of three separate tubes is eliminated.

It is known to derive during operation one output signal, which contains information about the three colour components and about their instant of occurrence, from a single camera tube comprising a colour filter of special design, for example a camera tube of the image-iconoscope or of the image-orthicon type. The signal portion containing said information is termed the indexing signal and usually occurs in the form of pulses either in the blacker-than-black region or in the whiter-than-white region (see for example U.S.P.'s 2,696,520 and 2,769,-855).

For this purpose said colour filter is made up of a number of groups each comprising three colour filters for passing red, green and blue light respectively. Between each two groups, provision is made of so-called index filters which are either perfectly transparent or fully opaque.

In the first-mentioned case, no additional light source is wanted, since the intensity of the light passed by the indexing strips then exceeds that of the light having penetrated to the photo-sensitive target through the colour filter. The light having the greatest intensity is converted into an electric signal of maximum possible amplitude. Since, however, the amplitudes of the indexing signals should exceed those of the maximum possible amplitudes of the image signals, that is within the whiter-than-white region, this means that the light-sensitive material on the photo-sensitive target is not fully utilized in forming the image signals. Hence, the indexing signals are obtained at the cost of the contrast to be obtained. Moreover, due to spreading of the light passing through the index strips, also those parts of the photo-sensitive target will be illuminated which should exclusively be irradiated with the light from the colour filters, which involves colour contamination.

In the second case, both the light of an additional source of light and the light of the scene to be televised is incident on the photo-sensitive target through the filter. Through the additional source of light a part of the conversion capacity of the target is used to form an output signal having a constant level (the new black level). Since, however, light can not pass through the opaque index strips, this constant level, in scanning the photo-sensitive target, will be interrupted at instants at which the electron beam scans target areas situated beneath index strips. In this case also the indexing signal is obtained at the cost of the contrast to be secured, since the light from the scene is now capable of utilizing the light-sensitive material only from the artificially created black level to the saturation limit for conversion into electric signals.

In camera tubes in accordance with the invention, these imitations are obviated and for this purpose the tube is characterized in that the camera tube used is of the vidicon type, whose photo-conductive layer provided at the surface of a transparent, plate-shaped electrode connected to the output terminal is divided into $k$ elongated strips, while provision is made of small spaces between each two juxtaposed strips.

The use of a camera tube of the vidicon type is based on the realization that such a camera tube alone permits indexing signals to be obtained, while fully utilizing the light-sensitive material.

Operating camera tubes in accordance with the invention requires a switching device having the feature that the electron beam produced by the electron gun is deflected line by line in a direction at right angles to the longitudinal direction of the $k$ photo-conductive strips with the production not only of the signals containing information about the $m$ colour components but also of indexing signals through an output impedance connected to said output terminal during the time periods the electron beam passes the recessed spaces between the $k$ strips.

In order that the invention may be readily carried into effect, an example of a camera tube according to the invention together with its associated circuitry will now be described in detail with reference to the accompanying drawings, in which FIG. 1 shows in block-schematic form the camera tube and the circuitry required for operating the camera tube.

Figure 2:
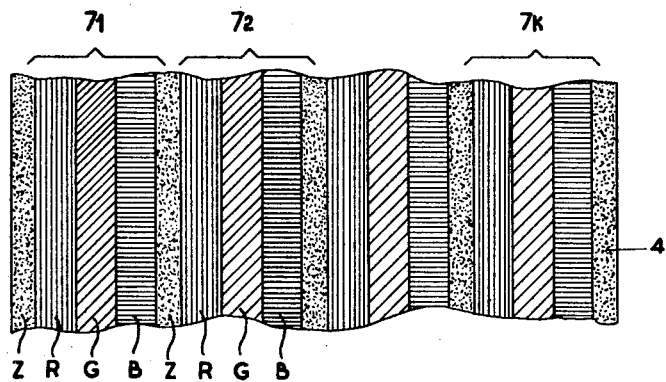

FIG. 2 shows the colour filter inside the camera tube, and

Figure 3:
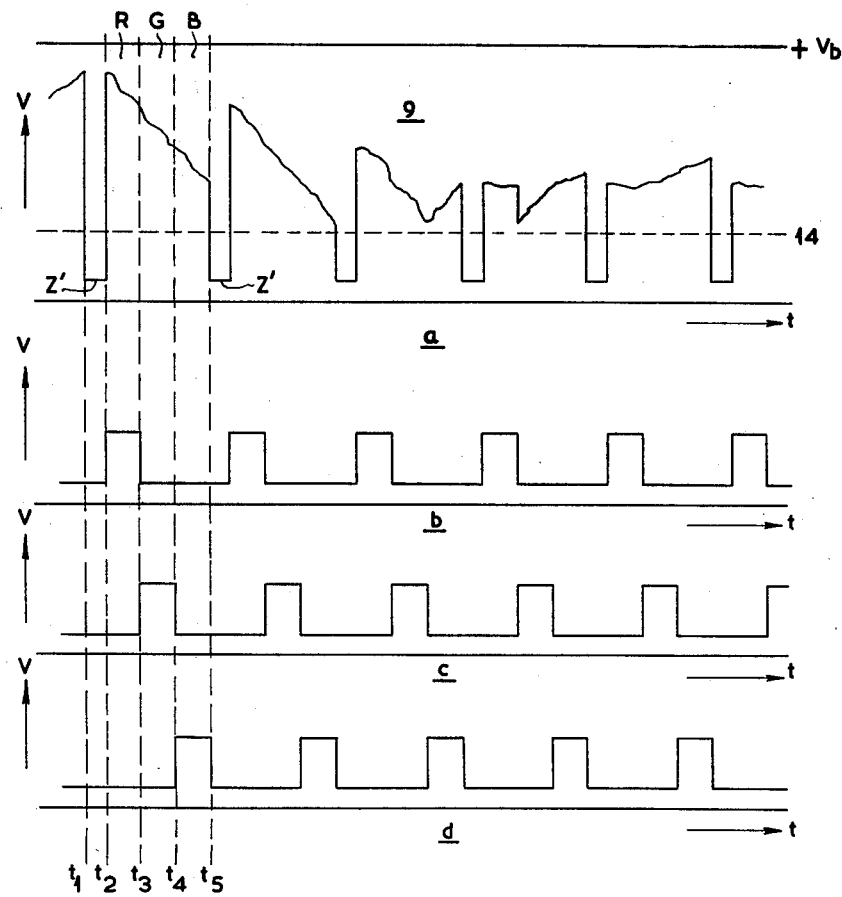

FIG. 3 serves to explain the invention.

FIG. 1 is a cross-section of a vidicon camera tube 1 in plan view. This tube, which is known per se, comprises in accordance with the invention a particular photo-sensitive target 2 provided at front of the tube on the glass wall 3. This target 2 can be made of lead monoxide (PbO) or of antimony trisulphide ($Sb_2O_3$).

The photo-sensitive target itself is made up of a filter 4, a transparent plate-shaped electrode 5 and $k$ photo-conductive, vertical, elongated strips $6_1$ to $6_k$. The photo-conductive strips are provided at the surface of an electrode 5 facing the electron gun 21, while the colour filter 4 is provided at the opposite surface. It will be appreciated that the colour filter 4 may alternatively be provided outside the tube if provision be made that the light passing through the colour filter is incident on the photo-conductive strips.

The filter 4 is shown in front view in FIG. 2. This filter is made up of $k$ groups $7_1$ to $7_k$ of $(m+1)$ vertical strips such that, of each $(m+1)$ strips, m strips act as colour filters and one strip is an index strip. In the present example, $m$ is chosen to be 3 so that each group comprises three colour filters R, G and B passing the red, green and blue colour components respectively of the light incident on them.

For clarity, it is to be noted that the photo-conductive strips consist of a material, the electrical impedance of which varies inversely proportionally to the intensity of incident electro-magnetic or corpuscular radiation.

The light passed by the colour filters, that is electro-magnetic radiation, falls on photo-conductive strips $6_1$ to $6_k$ so that the impedance of each of these strips decreases locally according as the brightness of the colour concerned increases.

Further, the filter 4 comprises index strips $z$ which are opaque to incident light and, at least at the surface facing the tube (that is the side where the filter 4 rests on the electrode 5), have such a finish as to avoid undue reflections.

The spaces between the strips $6_1$ to $6_k$ are located just behind the strips $z$ of the filter 4. If the electron beam 8 scans the target 2 line by line, each time in the direction from the strip $6_1$ to the strip $6_k$ in a manner known per se, an output signal 9 as shown in FIG. 3a is obtained. This may be explained as follows:

As shown before, the impedance of the $1/m$ part of each photo-conductive strip invariably depends upon the intensity of the relative colour component passed by the filter in front of it. The instantaneous current through the resistor 10, which is connected to the electrode 5 through the output terminal, will consequently depend upon the local impedance of the strip then scanned. If, however, the beam 8 passes through a space between two photo-conductive strips, it impinges directly on the electrode 5 so that a maximum current will pass through the resistor 10.

This maximum current involves a maximum voltage drop, thus each time producing an indexing pulse $z'$ during the time in which the beam 8 passes through one of said spaces, as shown in FIG. 3a. Between two indexing signals $z'$ the signal contains information about the red (R), the green (G) and the blue (B) colour, which information can be split up in a manner set out hereinafter.

Due to said maximum voltage drop the amplitude of the indexing signals $z'$ will invariably exceed those on the brightest colour signal. This output signal 9 is on the one hand supplied, through an amplifier 11, to a gate circuit 12 and on the other hand to a phase reversing and separating circuit 13.

In this circuit 13, the signal 9 is first reversed in phase and subsequently, in the separating circuit, the pulses $z'$ below the line 14 (FIG. 3a) are separated from the colour signal and supplied to three delay networks 15, 16 and 17. A pulse $z'$ starting at the input of the delay network 15 at the instant $t_5$ is delayed by this network so that its leading edge appears at the output of the delay network 15 at the instant $t_2$ (FIG. 3). The same pulse is delayed by the network 16 over a time period $t_5$ to $t_3$, and by the network 17 over a time period $t_5$ to $t_4$. Subsequently, the three output signals of the delay networks 15, 16 and 17 are supplied to pulse-shaping circuits 18, 19 and 20. The last-mentioned circuits may, for example, be monostable multivibrators. The output signal of the delay network 15 switches the multivibrator of the circuit 18 from the stable to the unstable state at the instant $t_2$ and this multivibrator re-assumes its stable state at the instant $t_3$. The output signal of the pulse-shaping circuit 18 is shown in FIG. 3b. Similarly, the output signals of the delay networks 16 and 17 start up the multivibrators of the circuits 19 and 20 so that the latter form output signals as shown in FIGS. 3c and 3d. The signals thus obtained control the gate circuit 12. This may be made up of three discharge tubes which are set in such manner as to remain cut off notwithstanding the total signal 9 is supplied to a control electrode of each of these tubes. These tubes are made conductive only by the output signals of the circuits 18, 19 and 20.

Thus, for example, the signal shown in FIG. 3b is applied to a second control electrode of the first of the three gate tubes and makes this tube conductive each time during a time period $t_3$–$t_2$. During this time period the signal 9 contains information only about the red colour component so that the red signal can be taken through the output terminal of this tube.

Accordingly, the signals shown in FIGS. 3c and 3d release the second and third gate tube only during the time periods $t_4$–$t_3$ and $t_5$–$t_4$ so that the green and the blue signals can be taken from the output terminals of the last-mentioned tubes respectively.

Said output terminals of the three gate tubes are designated by R, G and B respectively in FIG. 1 and the colour signals taken from these terminals can be integrated with respect to time and subsequently composed in known manner to form a brightness signal and modulated onto an auxiliary carrier wave, subsequently to which the brightness signal and the modulated auxiliary carrier wave are jointly transmitted, after modulation on a main carrier wave.

Alternatively, the three separate colour signals may be utilized in a different manner by applying them to at least one monitor picture tube with three guns for controlling the televised image.

When using a camera tube in accordance with the invention for televising three colour signals simultaneously, conversion of light into electric signals occurs with maximum efficiency for the camera tube concerned. As stated in the preamble, this applies by no means to conventional systems which either use an additional light source or perfectly transparent filters for the strips determining the indexing signals.

It will be appreciated that the spaces between the strips $6_1$ to $6_k$ should be as narrow as possible in order to lose as little image information as possible. This, however, depends upon the cross-sectional area of the focussed electron beam. The better this focussing, the narrower said spaces may be and the larger the surface of the photo-sensitive target, which can be utilized for the actual conversion of light into colour signals.

It will moreover be understood that the filter for forming the indexing signals is as such not absolutely necessary. Should the strips $z$ be omitted and the $k$ groups of $m$ colour filters engage each other, the indexing signal will equally be formed if the electron beam 8 impinges directly on the electrode 5. However, when making provision of the opaque strips $z$ the distribution of the illumination over the strips $6_1$ to $6_k$ will be better.

This camera tube may alternatively be constructed so as to permit colour images having $m$ colour components to be derived. In this case each of the $k$ groups of the color filter 4 should comprise $m$ colour filters in place of three colour filters. Moreover, the circuitry for splitting up these $m$ colour informations will then have to be matched. This requires the use of $m$ delay networks, $m$ monostable multivibrator circuits and $m$ gate tubes.

The delay periods of the $m$ networks are as follows:

The first network (cf. network 17 shown in FIG. 1) has a delay corresponding to the $1/m$ part of the time required by the electron beam, in scanning a line, for scanning one of the $k$ strips. With regard to the network 17 this is:

$$\tfrac{1}{3}(t_5 - t_2)$$

With respect to the second network this is the $2/m$ part of this time, for the third network the $3/m$ part and so on, while for the $(m-1)$ network this delay is equal to the $m-1/m$ part and for the last of the $m$ networks it corresponds to said time itself. The multivibrator circuits are each alternately switched from the stable state to the unstable state by the signal from the associated delay network and re-assume the stable state after $1/m$ part of said time. The output signals of these multivibrators alternately release the $m$ gate tubes of the circuit 12 during $1/m$ part of said time.

The $m$ colour signals may be taken from the $m$ output terminals of the gate tubes.

What is claimed is:

1. A color television camera tube of the vidicon type for televising an image comprising a radiation-responsive, electron-receiving target, said target comprising a radiation-transparent, plate-like electrode and a plurality of spaced, elongated, generally-parallel photo-conductive strips on said transparent electrode, means for separating said image into component colors and for registering said colors with said photo-conductive strips, means for producing an electron beam and for scanning the said target with said beam transverse to the elongated photo-conductive strips, and output means coupled to the transparent electrode for deriving output signals when said target is scanned.

2. A camera tube as set forth in claim 1 wherein a color filter is provided on the side of the transparent electrode opposite to that on which the photo-conductive strips are provided, said color filter comprising plural different-color-component-transmitting strips extending parallel to and registered with each of said photo-conductive strips.

3. A color television camera tube of the vidicon type comprising a radiation-responsive, electron-receiving target, said target comprising a radiation-transparent, plate-shaped electrode and on its back a plurality of spaced, elongated, generally-parallel photo-conductive strips, a color filter in front of said transparent electrode, said color filter comprising plural groups of different-color-component-transparent filter strips each being elongated and generally parallel to one another and the photo-conductive strips, each group of filter strips being in registration with one photo-conductive strip, a radiation-opaque strip between each group of filter strips and in registration with each space between the photo-conductive strips, means for producing an electron beam and for scanning the said target with said beam transverse to the elongated photo-conductive strips, and output means coupled to the transparent electrode for deriving output signals when said target is scanned.

4. A camera tube as set forth in claim 3 wherein the spaces between the photo-conductive strips are very narrow.

5. A camera tube as set forth in claim 4 wherein the output signal is coupled to a separating circuit for separating the signals produced when the beam impinges directly on the electrode through the spaces between the photo-conductive strips.

6. A camera tube as set forth in claim 5 wherein plural delay circuits of different delays are coupled to the separating circuit, and a gate circuit is provided actuable by the differently delayed signals for passing the signal derived from the output means.

References Cited in the file of this patent

UNITED STATES PATENTS

| | | |
|---|---|---|
| 2,738,379 | James et al. | Mar. 13, 1956 |
| 2,792,522 | Welch | May 14, 1957 |
| 2,899,489 | Cheetham et al. | Aug. 11, 1959 |